United States Patent
Fu et al.

(10) Patent No.: US 9,445,335 B2
(45) Date of Patent: Sep. 13, 2016

(54) HANDOVER PREDICTION USING HISTORICAL DATA

(75) Inventors: Jing Fu, Solna (SE); Åsa Bertze, Spånga (SE); Icaro L. J. Da Silva, Sollentuna (SE); Fredrik Kuivinen, Johanneshov (SE); Yu Wang, Solna (SE)

(73) Assignee: TELEFONAKTIEBOLAGET L M ERICSSON, Stockholm (SE)

(*) Notice: Subject to any disclaimer, the term of this patent is extended or adjusted under 35 U.S.C. 154(b) by 0 days.

(21) Appl. No.: 14/406,941

(22) PCT Filed: Jun. 13, 2012

(86) PCT No.: PCT/SE2012/050640
§ 371 (c)(1),
(2), (4) Date: Dec. 10, 2014

(87) PCT Pub. No.: WO2013/187813
PCT Pub. Date: Dec. 19, 2013

(65) Prior Publication Data
US 2015/0146689 A1    May 28, 2015

(51) Int. Cl.
*H04W 4/00* (2009.01)
*H04W 36/24* (2009.01)
(Continued)

(52) U.S. Cl.
CPC .......... *H04W 36/245* (2013.01); *H04J 3/0632* (2013.01); *H04W 36/023* (2013.01); *H04W 36/08* (2013.01); *H04W 36/30* (2013.01)

(58) Field of Classification Search
CPC ........... H04W 36/245; H04W 36/023; H04W 36/08; H04J 3/0632
See application file for complete search history.

(56) References Cited

U.S. PATENT DOCUMENTS

2006/0003768 A1*  1/2006  Chiou ................. H04W 36/245
                                                          455/436
2006/0077994 A1*  4/2006  Spindola ............... H04J 3/0632
                                                          370/412
(Continued)

FOREIGN PATENT DOCUMENTS

EP    1 954 067    8/2008
EP    2 227 054    9/2010
(Continued)

OTHER PUBLICATIONS

PCT International Search Report for International application No. PCT/SE2012/050640, Jun. 18, 2013.
(Continued)

*Primary Examiner* — Abdelnabi Musa
(74) *Attorney, Agent, or Firm* — Patents on Demand, P.A.; Brian K. Buchheit; Scott M. Garrett

(57) ABSTRACT

A method in an apparatus 301 for adapting play out of data packets during a handover of a user equipment (UE) 302 between a first radio network node (RNN) 304 and a second RNN 306. The packets relate to a real-time service application. The UE, first and second RNNs are comprised in a communications system 300. The method comprises generating at least one message to an adaptation control module. The at least one message is generated based on collected historical handover information and on current handover information. The method comprises further, by means of the adaptation control module, adapting the adapting the play out of the packets in dependence of the at least one message such that radio quality degradation in the real-time service application is controlled.

15 Claims, 8 Drawing Sheets

(51) Int. Cl.
*H04J 3/06* (2006.01)
*H04W 36/02* (2009.01)
*H04W 36/08* (2009.01)
*H04W 36/30* (2009.01)

(56) References Cited

U.S. PATENT DOCUMENTS

| | | | |
|---|---|---|---|
| 2006/0245394 | A1 | 11/2006 | Baba et al. |
| 2008/0076423 | A1* | 3/2008 | Lee ............... H04W 36/08 455/436 |
| 2009/0156210 | A1* | 6/2009 | Ponce De Leon .... H04W 36/30 455/436 |
| 2010/0041404 | A1* | 2/2010 | Kim ............... H04W 36/245 455/436 |
| 2012/0122456 | A1* | 5/2012 | Gao ............... H04W 36/245 455/436 |
| 2013/0301617 | A1* | 11/2013 | Kuhn ............ H04W 36/0033 370/331 |
| 2015/0103806 | A1* | 4/2015 | Kuusilinna ......... H04W 64/00 370/332 |

FOREIGN PATENT DOCUMENTS

| WO | WO 2008/023814 | 2/2008 |
|---|---|---|
| WO | WO 2009/021711 | 2/2009 |
| WO | WO 2009/093799 | 7/2009 |

OTHER PUBLICATIONS

PCT Written Opinion of the International Searching Authority for International application No. PCT/SE2012/050640, Jun. 18, 2013.

"A History-Based Handover Prediction for LTE Systems" by Huaining Ge et al., 2009.

"Comparison of User Mobility Pattern Prediction Algorithms to Increase Handover Trigger Accuracy" by Michaelis et al., 2006.

3GPP TS 26.114 V9.5.0; 3rd Generation Partnership Project; Technical Specification Group Services and system Aspects; IP Multimedia Subsystem (IMS); Multimedia Telephony; Media handling and interaction (Release 9), Mar. 2011.

3GPP TS 36.300 V9.9.0; 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 9), Dec. 2011.

3GPP TS 36.331 V9.9.0; 3rd Generation Partnership Project; Technical Specification Group Radio Access Network; Evolved Universal Terrestrial Radio Access (E-UTRA); Radio Resource Control (RRC); Protocol specification (Release 9), Dec. 2011.

* cited by examiner

HANDOVER PREDICTION USING HISTORICAL DATA

PRIORITY

This nonprovisional application is a U.S. National Stage Filing under 35 U.S.C. §371 of International Patent Application Serial No. PCT/SE2012/050640, filed Jun. 13, 2012 and entitled "Handover Prediction Using Historical Data."

TECHNICAL FIELD

Embodiments herein relate to an apparatus, a method therein, a user equipment comprising the apparatus and to a computerized device comprising the apparatus. In particular, embodiments herein relate to the adaptation of play out of data packets during a handover of the user equipment between a first radio network node and a second radio network node.

BACKGROUND

Communication devices such as User Equipments (UE) are enabled to communicate wirelessly in a radio communications system, sometimes also referred to as a radio communications network, a mobile communication system, a wireless communications network, a wireless communication system, a cellular radio system or a cellular system. The communication may be performed e.g. between two user equipments, between a user equipment and a regular telephone and/or between a user equipment and a server via a Radio Access Network (RAN) and possibly one or more core networks, comprised within the wireless communications network.

User equipments are also known as e.g. mobile terminals, wireless terminals and/or mobile stations, mobile telephones, cellular telephones, or laptops with wireless capability, just to mention some examples. The user equipments in the present context may be, for example, portable, pocket-storable, hand-held, computer-comprised, or vehicle-mounted mobile devices, enabled to communicate voice and/or data, via the RAN, with another entity.

The wireless communications network covers a geographical area which is divided into cell areas, wherein each cell area being served by a network node such as a Base Station (BS), e.g. a Radio Base Station (RBS), which sometimes may be referred to as e.g. eNB, eNodeB, NodeB, B node, or BTS (Base Transceiver Station), depending on the technology and terminology used. The base stations may be of different classes such as e.g. macro eNodeB, home eNodeB or pico base station, based on transmission power and thereby also cell size. A cell is the geographical area where radio coverage is provided by the base station at a base station site. One base station, situated on the base station site, may serve one or several cells. Further, each base station may support one or several radio access and communication technologies. The base stations communicate over the radio interface operating on radio frequencies with the user equipments within range of the base stations.

In some RANs, several base stations may be connected, e.g. by landlines or microwave, to a radio network controller, e.g. a Radio Network Controller (RNC) in Universal Mobile Telecommunications System (UMTS), and/or to each other. The radio network controller, also sometimes termed a Base Station Controller (BSC) e.g. in GSM, may supervise and coordinate various activities of the plural base stations connected thereto. GSM is an abbreviation for Global System for Mobile Communications (originally: GroupeSpécial Mobile).

In the context of this disclosure, the expression Downlink (DL) is used for the transmission path from the base station to the user equipment. The expression Uplink (UL) is used for the transmission path in the opposite direction i.e. from the user equipment to the base station.

In 3rd Generation Partnership Project (3GPP) Long Term Evolution (LTE), base stations, which may be referred to as eNodeBs or even eNBs, may be directly connected to one or more core networks.

UMTS is a third generation mobile communication system, which evolved from the GSM, and is intended to provide improved mobile communication services based on Wideband Code Division Multiple Access (WCDMA) access technology. UMTS Terrestrial Radio Access Network (UTRAN) is essentially a radio access network using wideband code division multiple access for user equipments. The 3GPP has undertaken to evolve further the UTRAN and GSM based radio access network technologies.

According to 3GPP/GERAN, a user equipment has a multi-slot class, which determines the maximum transfer rate in the uplink and downlink direction. GERAN is an abbreviation for GSM EDGE Radio Access Network. EDGE is further an abbreviation for Enhanced Data rates for GSM Evolution.

Jitter buffers or de-jitter buffers are used to counter jitter introduced by queuing in packet switched networks so that a continuous play out of audio or video transmitted over the network is ensured. A jitter buffer delays the play out of each audio frame or video frame for a certain period of time, which introduces an additional delay for the end-to-end flow, but the jitter buffer compensates for delay variations in the transport.

If data packets are delayed long enough to allow the data packet with the highest transport delay to arrive before its scheduled play out time, the receiver can make a proper reconstruction of the signal. However, this will cause an unacceptable long mouth-to-ear delay for the call. On the other hand, if the jitter buffer is very short or non-existing the network delay variations will cause some data packets to arrive too late for their scheduled play out time, causing interruptions in the speech.

A jitter buffer can either be of a fixed size, or have the capability of adjusting its size dynamically in order to optimize the tradeoff between added delay and late losses. The expression "late losses" when used herein refers to data packets arriving too late for their scheduled play out time. A jitter buffer with the capability of adjusting its size dynamically, as mentioned above, is called an adaptive jitter buffer.

An adaptive jitter buffer continuously adjusts the jitter buffer depth according to measurements of jitter for previous packets in the flow.

FIG. 1 shows an illustration of an exemplary structure of a prior art MTSI speech receiver 100 comprising an adaptive jitter buffer 102 that receives audio or video payload such as Real-time Transport Protocol (RTP) payload. Reference to FIG. 1 will be made in order to clarify some terminology and the relation between different functional components of the receiver 100. The receiver 100 comprises further a jitter buffer adaptation logic 104 and a network analyzer 106. The jitter buffer adaptation logic 104 uses measurements of packet arrival times received from the network analyzer 106 and current jitter buffer status to determine if the buffer size needs to be adjusted, and as a result of that whether the play out time of some speech frames should be compressed or expanded. The receiver 100 comprises also an adaptation unit 108 and a speech decoder 110 which may perform compression or expansion of speech frames by performing so called time scaling, which may lead to impairments of the speech quality.

3GPP defines some minimum requirements that a jitter buffer algorithm in MTSI must fulfill. The exact algorithm is implementation dependent.

Handover in a Communication System

The concept of a communication system is that it has large number base stations covering a geographical area, providing mobility to the users. As a result it is a very basic requirement of the communications system that as the mobile handsets move from one cell to another, it must be possible to handover the call or the data session over from one base station to another with small disruptions.

The handover (HO) may occur between cells within the same Radio Access Technology (RAT), e.g., when a connection is handed over from an LTE cell to another LTE cell. Also an inter-RAT handover may happen, e.g., from an LTE cell to a WCDMA cell.

The purpose of the Intra-LTE handover feature is to manage the handover of a user equipment from one LTE cell to another LTE cell. This ensures that the user equipment is being served by the best cell at all times, and avoids call drops as the user equipment moves out of coverage of one LTE cell into the coverage of another LTE cell. The handover in LTE is network controlled based upon user equipment measurement reports of the serving and neighboring cells.

The intra-LTE handover process is managed by the radio base station. As previously mentioned, the radio base station is named eNodeB in LTE. The source eNodeB and target eNodeB communicate through an X2 link if there is one between the two eNodeBs. When an X2 link is not operable, the eNodeBs communicate over the Mobility Management Entity (MME) through S1 links.

FIG. 2 shows the procedure of an intra-LTE handover according to 3GPP TS 36.300. The handover procedure can be divided into three phases: the measurement phase, the preparation phase, and the execution phase.

Measurement Phase

In step 1 of FIG. 2, the network sends out measurement control, which sets different parameters related to handover to the user equipment (UE). One of the parameters is named handover hysteresis, or "HO hysteresis", and another parameter is called "Time To Trigger" (TTT).

The UE makes periodic measurements of Radio Signal Received Power (RSRP) and Radio Signal Received Power (RSRQ) based on the radio signal received from the serving cell and from adjacent cells. In case the handover algorithm is based on RSRP values, when the RSRP value from an adjacent cell is higher than the one from the serving cell by a number of dBs equal to HO hysteresis, a timer is started and the UE triggers an Enters Event3A which means the UE is prepared to trigger a 3A event, which is the intra-frequency HO triggering event in LTE accordingly to 3GPP TS 36.300.

Once the timer is started, two things may happen:

A first thing that may happen during the TTT is that the RSRP of the serving cell becomes better than the best adjacent cell by a number of dBs equal to HO hysterisis. In this case the UE will stop the timer and triggers a Leave Event3A event so that the handover will not happen. The UE will continue to be served by the serving cell and nothing will be reported to the network.

A second thing that may happen is that TTT is reached without the serving cell becomes better than the best adjacent cell by a number of dBs equal to HO hysterisis. In step 2, the UE will send a measurement report to the network and request for handover.

The TTT and hysteresis are configuration parameters. The TTT is normally between 0 and 5120 ms according to 3GPP TS 36.331, with the default value set to 40 ms for Ericsson LTE networks according to L11B CPI. The hysteresis is in order of a few dBs with the default of 1 dB in Ericsson LTE networks according to L11B CPI.

Preparation Phase

The preparation phase is from when the eNodeB receives the measurement report in step 2, until the eNodeB sends out RRC connection reconfiguration in step 7. During this time, the source eNodeB prepares the handover by contacting target eNodeB. Also, the UE is reachable from the network during the phase.

From live measurements, we found that the average handover preparation time is 32 ms, which figure is based on more than 1 million samples of recent data.

Execution Phase

The execution phase contains an outage time where neither the source cell nor the target cell can reach the UE. That is during handover execution between step 7 and step 11 in FIG. 2. Data packets arriving at the source cell during the outage time are either dropped or forwarded to the target cell, where the target cell will send the data packets to UE when it is reconnected. The latter approach is taken by current Ericsson LTE networks, where packet forwarding is implemented through the X2 interface.

Despite the use of data packet forwarding, the outage time during a LTE handover is in average about 90 ms according to measurements. Although some of the handovers have a significantly larger outage time, above 200 ms.

A real-time service like VoIP typically includes a jitter buffer algorithm which works fine in normal situations. However, handover in mobile networks may have a significant impact on the jitter buffer. During a handover, packets can be delayed 90 ms or more because of the handover outage time. The user equipment may not have enough frames in the jitter buffer to deal with this, resulting in buffer under-run which gives bad media quality to the end-user.

US patent US 2006/0245394 describes a method to improve application layer service quality during a handover situation. OSI layer 2-originated indications of a handover being imminent, a link down for handover, and a new link up after handover is signaled to an application operating at an OSI layer above layer 3. The indications may be used by the application to take proactive measures prior to the actual handover, e.g., buffer more data that can be used during the handover outage e.g. in the case of a non-real-time streaming application.

However, the time available from when the handover decision is taken until the handover actually happens may be quite small, from our investigation in LTE around 30 ms. For a real-time service like VoIP it is not possible to pre-buffer data to cover the handover outage time during this limited time interval.

There are a number of papers published on handover prediction, e.g. "A History-Based Handover Prediction for LTE Systems", Huaining Ge; Xiangming Wen; Wei Zheng; Zhaoming Lu; Bo Wang; International Symposium on Computer Network and Multimedia Technology, 2009, and-"Comparison of User Mobility Pattern Prediction Algorithms to increase Handover Trigger Accuracy", Michaelis, S. Wietfeld, C, Vehicular Technology Conference, 2006. In these papers UE movement prediction is used as an additional information compared to classical handover preparation and triggers. Some use statistical analysis, others complex pattern detection algorithms or historic analysis to predict future movements of the UEs. The target of the proposed handover prediction is to aid the triggering of cell handovers, thereby improving the handover performance from a network point of view, for example by minimizing the number of ping-pong handovers in the communications system. By ping-pong handovers is herein meant several handovers between the same two radio base stations within a certain period of time. The certain period of time may vary between different radio technologies.

Using handover prediction algorithms to improve handover performance in the communications system may be very useful, for example to remove unnecessary ping-pong handovers, thereby increasing the overall service quality of the users. However, handovers are a normal and necessary part of a mobile communications system, and even if all necessary cases are removed by smart algorithms, real-time applications may still suffer performance problems due to necessary handovers in the communications system.

SUMMARY

An object of embodiments herein is to provide a way of improving the performance in a communications network.

According to a first aspect of embodiments herein, the object is achieved by a method in an apparatus for adapting play out of data packets during a handover of a user equipment between a first radio network node and a second radio network node. The data packets relate to a real-time service application and which user equipment, first and second radio network nodes are comprised in a communications system.

The apparatus generates at least one message to an adaptation control module. The at least one message is generated based on collected historical handover information and on current handover information. The collected historical handover information relates to at least one handover previously performed between the first radio network node and the second radio network node by the user equipment. Further, the current handover information relates to current radio control parameter settings for the first radio network node and the second radio network node.

Further, the apparatus, by means of the adaptation control module, adapts the adapting the play out of the data packets in dependence of the at least one message such that radio quality degradation in the real-time service application is controlled.

According to a second aspect of embodiments herein, the object is achieved by an apparatus for adapting play out of data packets during handover of a user equipment between a first radio network node and a second radio network node. The data packets relate to a real-time service application and which user equipment, first and second radio network nodes are comprised in a communications system.

The apparatus comprises a handover prediction module configured to generate at least one message based on collected historical handover information and on current handover information. The collected historical handover information relates to at least one handover previously performed between the first radio network node and the second radio network node by the user equipment. Further, the current handover information relates to current radio control parameter settings for the first radio network node and the second radio network node.

Further, the apparatus comprises an adaptation control module configured to adapt the play out of the data packets in dependence of the at least one message, whereby radio quality degradation in the real-time service application is minimized.

According to a third aspect of embodiments herein, the object is achieved by a user equipment comprising the apparatus.

According to a fourth aspect of embodiments herein, the object is achieved by a computerized device comprising the apparatus.

Since the play out of the data packets in dependence of the generated at least one message, the radio quality degradation in the real-time service application is minimized. This results in an improved performance in the communications network.

An advantage of embodiments herein is that jitter buffer under run is minimized during handover situations.

A further advantage of embodiments herein is that, under normal conditions, the size of a jitter buffer is kept low due to the handover prediction signaling.

A yet further advantage of embodiments herein is that an improved quality of the real-time service, e.g. an improved VoIP quality, is achieved.

BRIEF DESCRIPTION OF THE DRAWINGS

Examples of embodiments herein are described in more detail with reference to attached drawings in which.

DETAILED DESCRIPTION

Embodiments herein will be exemplified in the following non-limiting description.

Embodiments described herein provide for adapting play out of data packets during a handover of a user equipment between a first radio network node and a second radio network node. The data packets relate to a real-time service application, such as Voice over IP (VoIP), a video conferencing service application or a gaming application. However, the data packets may also relates to a file transfer service application over for example the Transmission Control Protocol (TCP) in order to avoid for example retransmission timeouts and an unnecessary slow-start of the TCP session.

Embodiments herein relate to the minimization of service quality degradations of real-time services due to handovers, by generating handover prediction and performance information which may be used by the real-time service application to adjust its operation in order to minimize quality degradations.

Figure 1:
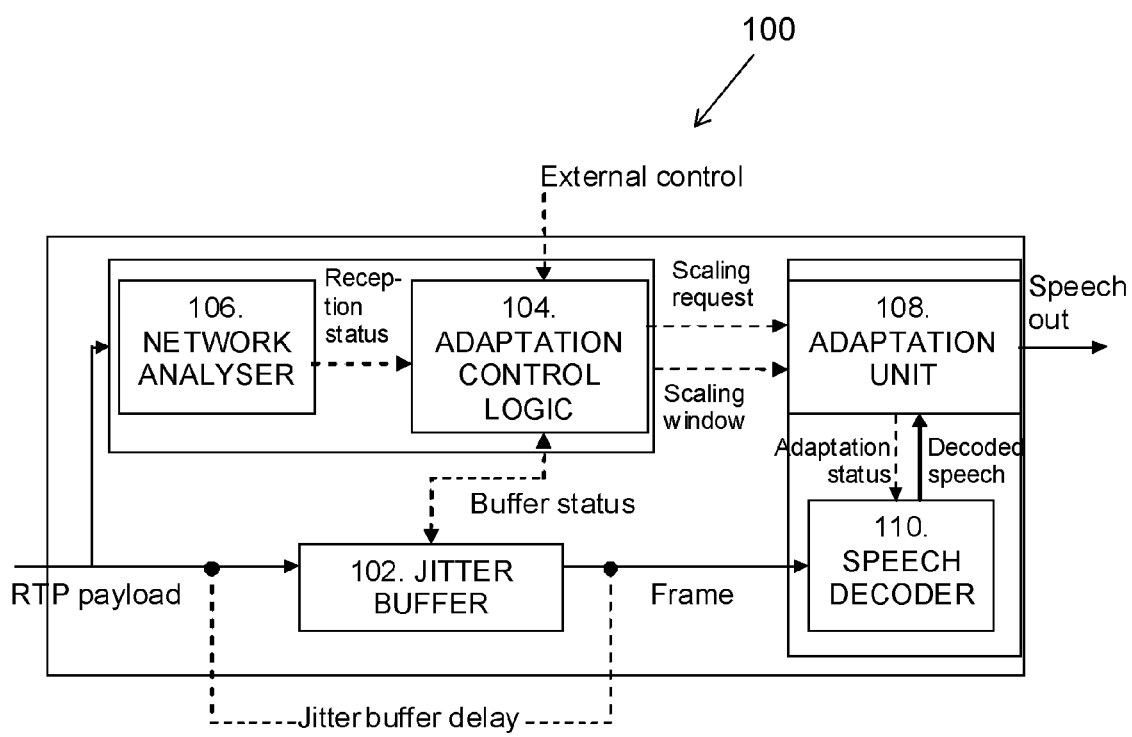
FIG. 1 is a prior art MTSI speech receiver.
Figure 2:
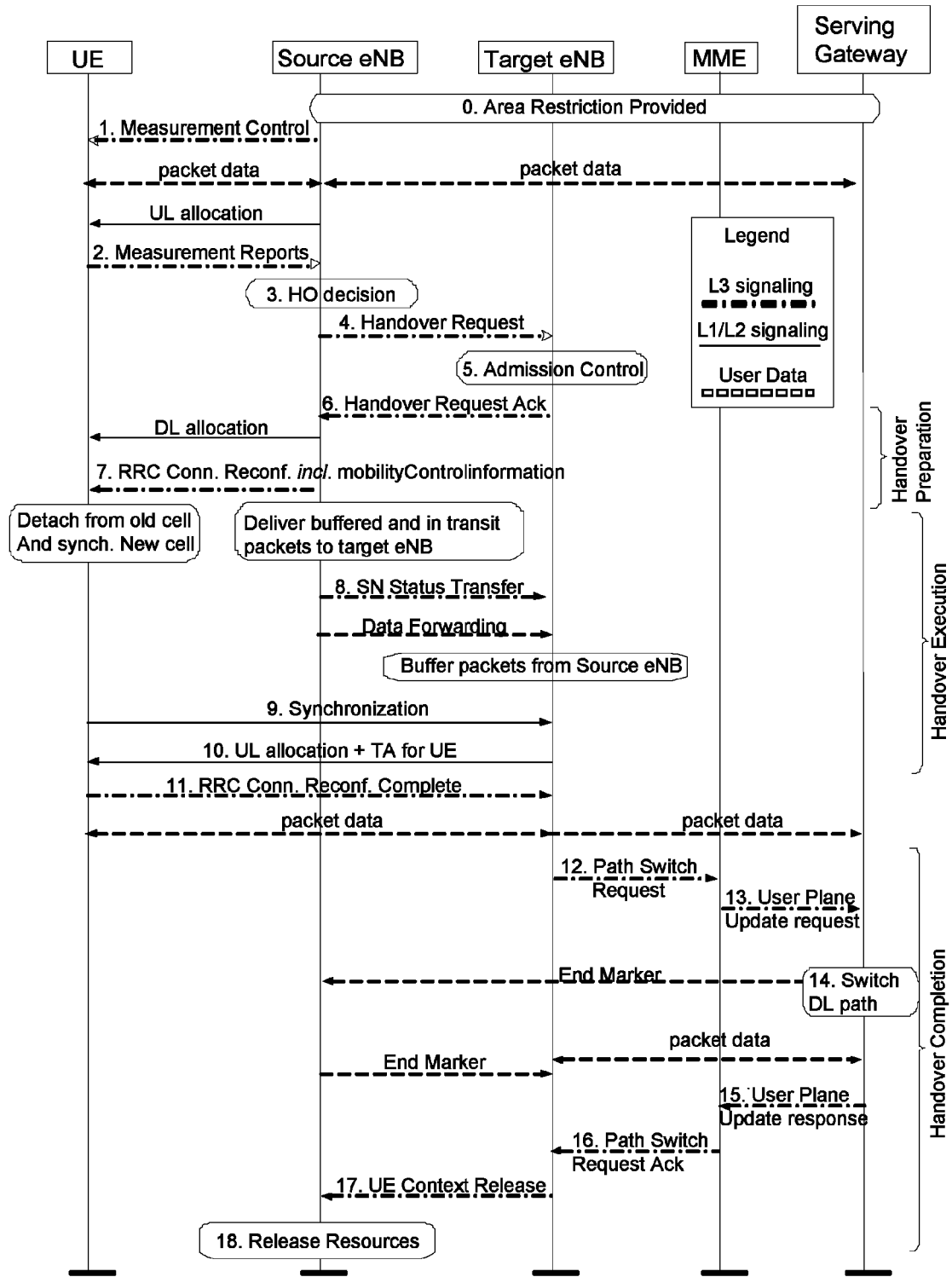
FIG. 2 is a schematic flow chart depicting an intra-LTE handover.
Figure 3:
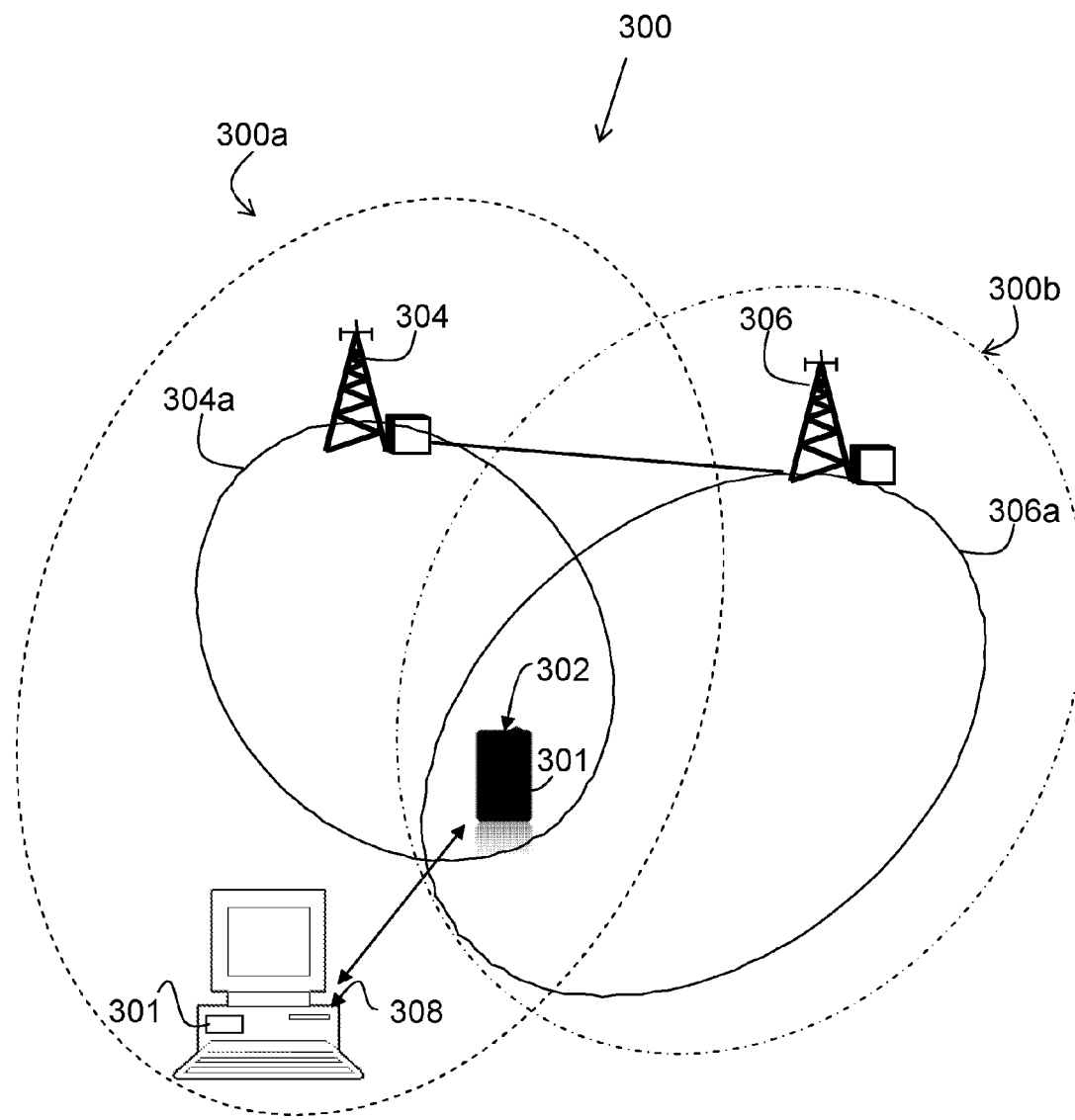
FIG. 3 is a schematic block diagram illustrating embodiments of a communications system.

FIG. 3 schematically illustrates embodiments of a radio communications system 300. The radio communication system 300 may be a 3GPP communications system or a non-3GPP communications system. The radio communications system 300 may comprises one or more of radio communications networks 302a, 302b. In FIG. 3, a first radio communications network 302a and a second radio communications network 302b are shown. The first and second radio communications networks 302a, 302b may be configured to support one or more Radio Access technologies (RATs). Further, the first and second radio communications networks 302a, 302b may be configured to support different RATs. Some examples of RATs are GSM, UTRAN, LTE, and UMTS.

The radio communication system 300 comprises further an apparatus 301 for adapting play out of data packets during a handover of a user equipment 302 between the first radio network node 304 and the second radio network node 306. The user equipment 302 is herein sometimes referred to as a first user equipment 302. The apparatus 301 may be comprised in the user equipment 302. The apparatus 301 will be described in more details below with reference to e.g. FIGS. 4 and 5.

The user equipment 302 may be e.g. a mobile terminal or a wireless terminal, a mobile phone, a computer such as e.g. a laptop, a tablet pc such as e.g. an iPad™, a Personal Digital Assistant (PDA), or any other radio network unit capable to communicate over a radio link in a cellular communications network. The user equipment 302 may further be configured for use in both a 3GPP network and in a non-3GPP network.

The radio communication system 300 comprises further a first radio network node 304 and a second radio network node 306. The first and second radio network nodes 304,306 are capable of serving the first user equipment 302.

The first radio network node 304 may be a base station such as an eNB, an eNodeB, Node B or a Home Node B, a Home eNode B, a radio network controller, a base station controller, an access point, a relay node (which may be fixed or movable), a donor node serving a relay, a GSM/EDGE radio base station, a Multi-Standard Radio (MSR) base station or any other network unit capable to serve the first user equipment 302 in the cellular communications system 300.

Further, the first radio network node 304 provides radio coverage over at least one geographic area 304a. The at least one geographic area 304a may form a cell. The user equipment 302 transmits data over a radio interface to the first radio network node 304 in an uplink (UL) transmission and the first radio network node 304 transmits data to the user equipment 302 in a downlink (DL) transmission. A number of other user equipments, not shown, may also be located within the geographic area 304a.

The second radio network node 306 may be a base station such as an eNB, an eNodeB, Node B or a Home Node B, a Home eNode B, a radio network controller, a base station controller, an access point, a relay node (which may be fixed or movable), a donor node serving a relay, a GSM/EDGE radio base station, a Multi-Standard Radio (MSR) base station or any other network unit capable to serve the user equipment 302 in the cellular communications system 300.

Further, the second radio network node 306 provides radio coverage over at least one geographic area 306a. The at least one geographic area 306a may form a cell. The user equipment 302 transmits data over a radio interface to the second radio network node 306 in an uplink (UL) transmission and the second radio network node 306 transmits data to the user equipment 306 in a downlink (DL) transmission. A number of other user equipments, not shown, may also be located within the geographic area 306a.

In some embodiments, the radio communications system 300 further comprises a second user equipment 308. The second user equipment 308 may comprise the apparatus 301. Further, the second user equipment may be e.g. a mobile terminal or a wireless terminal, a mobile phone, a computerized device such as e.g. a laptop, a tablet pc such as e.g. an iPad™, a Personal Digital Assistant (PDA), or any other radio network unit capable to communicate over a radio link in a cellular communications network. The second user equipment 308 may further be configured for use in both a 3GPP network and in a non-3GPP network.

The second user equipment 308 may be located within the first and/or second radio communications networks 300a, 300b and may thus be served by the first and/or the second radio network node 304,306.

In some embodiments, the second user equipment 308 comprises the apparatus 301. This will be described in more detail below.

In a general situation addressed by embodiments herein, the radio communications system 300 comprises at least one radio communication network 300a, 300b, capable of supporting at least one RAT. As mentioned, FIG. 3 schematically illustrates communications system 300 comprising two radio communications networks 300a, 300b. However, it should be understood that the number of communications network sharing a certain area may be may be more than two, as may the number of operators.

Figure 4:
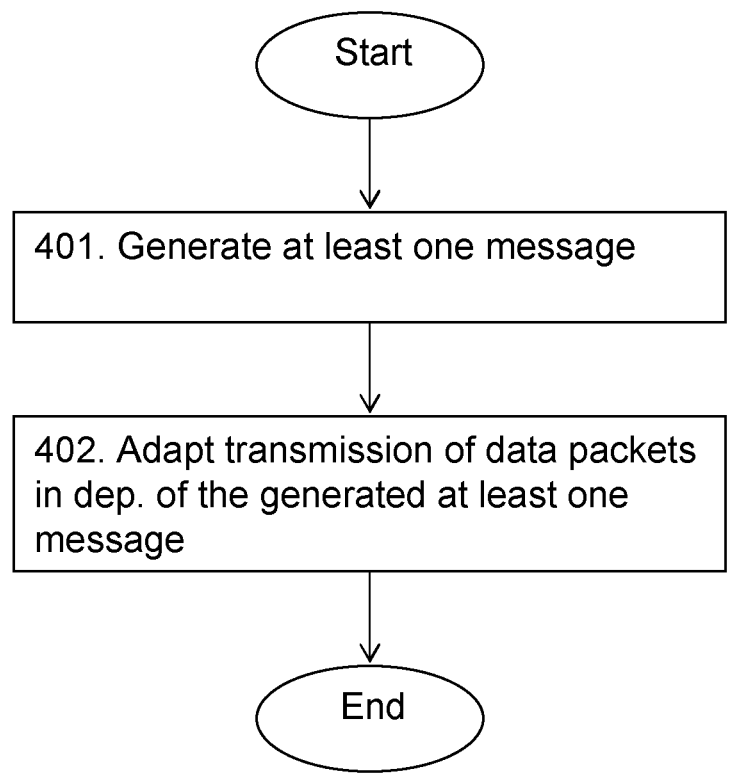
FIG. 4 is a flowchart depicting embodiments of a method in an apparatus.

A method in an apparatus 301 for adapting play out of data packets during a handover of the user equipment 302 between the first radio network node 304 and the second radio network node 306 will now be described with reference to FIG. 4.

As previously mentioned, the data packets relate to a real-time service application and the user equipment 302, first and second radio network nodes 304,306 are comprised in the communications system 300. Further, the apparatus 301 may be comprised in the user equipment 302 and/or in the second user equipment 308.

The actions do not have to be performed in the order stated below, but may be taken in any suitable order. Further, actions may be combined. Optional actions are indicated by dashed boxes.

Action 401

In order to be able to adapt the play out of the data packets in a handover situation, the apparatus 301 generates at least one message to an adaptation control module 504 comprised in the apparatus 301. The at least one message is generated based on collected historical handover information and on current handover information.

The collected historical handover information relates to at least one handover previously performed between the first radio network node 304 and the second radio network node 306 by the user equipment 302. For example, the collected historical handover information may comprise information relating to at least one of a point in time for the previously performed handover, a first radio network node 304, a second radio network node 306, a radio quality of a first radio network node 304 x seconds before the handover, a radio quality of the second radio network node 306 x seconds before the handover, a radio quality of the first radio network node 304 y seconds after the handover, a radio quality of the second radio network node 306 y seconds after the handover, a location of the user equipment 302 when performing a radio quality measurement, a handover result, or a handover outage time.

Further, the current handover information relates to current radio control parameter settings for the first radio network node 304 and the second radio network node 306. The current radio control parameter settings may be operator dependent and may be set in dependence of several factors.

In some embodiments, the apparatus 301 generates a first primary message when a calculated probability p that a handover will occur between the first radio network node 304 and the second radio network node 306 passes a first threshold value. The first primary message may comprise information that the handover will happen with the calculated probability p.

The first primary message may be generated when a first radio quality level of the first radio network node 304 is below a second threshold value, or when a relative radio quality between the first radio network node 304 and the second radio network node 306 is below a third threshold value.

In some embodiments, the first primary message is generated when a second radio quality level of the second radio network node 306 is higher than a first radio quality level of the first radio network node 304.

The apparatus 301 may generate the at least one message when the user equipment 302 knows that a handover is to happen. Further, the apparatus 301 may generate a second primary message comprising information about the handover that will happen. The user equipment 302 may know that a handover is to happen when the user equipment 302 has sent a measurement report to the communications system 300.

In some embodiments, the first primary message and/or second primary message comprises information about an expected point in time for the handover and about an expected outage time for the handover.

The first primary message and/or the second primary message may further comprise information about the estimated probability that the handover will occur, the expected time until handover outage will start, and/or expected duration of the handover outage.

The expected time until handover outage will start and the expected duration of the outage time may be important parameters for the adaptation control module 504 to know, since it will determine in what way and/or how much the adaptation control module 504 will need to adjust the current operation in order to minimize the quality degradation due to the expected handover.

The apparatus 301 may further be configured to generating a first secondary message comprising information about a cancellation of the handover. For example, the apparatus may generate such a handover cancellation message when the first primary message and/or the second primary message has been generated and when the first radio quality level of the first radio network node 304 is above the second threshold value.

In some embodiments, the apparatus 301 generates a second secondary message comprising information about an outage time that has started: The apparatus 301 may generate such a message when the first primary message and/or the second primary message has been generated and when a message confirming a beginning of the handover is received. The message confirming the beginning of the handover may for example be a Radio Resource Control (RRC) connection reconfiguration request.

Further, the apparatus 301 may generate a third secondary message comprising information about a finalized handover. In some embodiments, the apparatus 301 generates such a message when the first primary message and/or the second primary message have been generated and when a message confirming an end of the handover is sent. The message confirming the end of the handover may be an RRC connection reconfiguration complete message.

Action 402

In order to adapt the play out of the data packets to the handover situation, the adaptation control module 504 adapts the play out of the data packets in dependence of the at least one message such that radio quality degradation in the real-time service application is controlled.

In some embodiments, the adaptation control module 504 adapts the play out of data packets by increasing a fill level of a jitter buffer 505 comprised in the apparatus 301. The increasing of the fill level may be performed when the number of data packets relating to the real-time service application comprised in the jitter buffer 505 is determined not to be sufficient to avoid buffer under-run under a handover outage, when a probability p for a handover is above a threshold and before a handover is performed.

The fill level of the jitter buffer 505 may be adjusted by performing play out time adjustment, e.g. by performing time-scaling.

In addition to use handover prediction information in the apparatus 301, the apparatus 301 may also send the handover prediction information and current handover information to one or more peer apparatus 301. This will be described in more detail below with reference to FIG. 8. The peer apparatus may be comprised in peer first user equipment or in a peer second user equipment. The peer apparatus may use the information to further improve the service quality by for example adapting its transmission. For example in a VoIP call service, the apparatus may send (potential) handover information to its remote peer apparatus. Then, the peer apparatus may increase its jitter buffer to avoid potential buffer under-run when the user equipment 302 is performing a handover.

Figure 5:
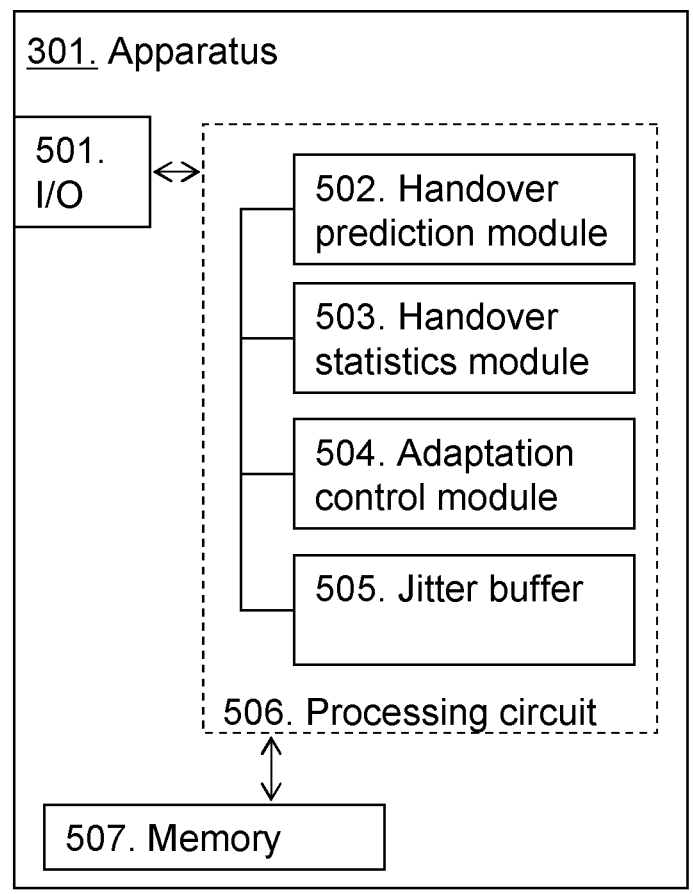
FIG. 5 is a schematic block diagram illustrating embodiments of an apparatus.

To perform the method actions in the apparatus 301 described above in relation to FIG. 4 for adapting play out of data packets during a handover of the user equipment 302 between the first radio network node 304 and the second radio network node 206, the apparatus 301 comprises the following arrangement depicted in FIG. 5.

As previously mentioned, the data packets relate to a real-time service application and the user equipment 302, first and second radio network nodes 304,306 are comprised in the communications system 300. Further, the apparatus 301 may be comprised in the user equipment 302 and/or in the second user equipment 308.

The apparatus 301 comprises an input and output port 501 configured to function as an interface for communication in the communication system 300. The communication may for example be communication with the first and/or second radio network node 304,306 and/or communication with the second user equipment 308.

The apparatus 301 comprises a handover prediction module 502 configured to generate at least one message based on collected historical handover information and on current handover information.

The collected historical handover information relates to at least one handover previously performed between the first radio network node 304 and the second radio network node 306 by the user equipment 302. The collected historical handover information may comprise information relating to at least one of a point in time for the previously performed handover, a first radio network node 304, a second radio network node 306, a radio quality of a first radio network node 304 x seconds before the handover, a radio quality of the second radio network node 306 x seconds before the handover, a radio quality of the first radio network node 304 y seconds after the handover, a radio quality of the second radio network node 306 y seconds after the handover, a location of the first user equipment 302 when performing a radio quality measurement, a handover result, or a handover outage time.

The current handover information relates to current radio control parameter settings for the first radio network node 304 and the second radio network node 306.

In some embodiments, the handover prediction module 502 is further configured to generate a first primary message when a calculated probability p that a handover will occur between the first radio network node 304 and the second radio network node 306 passes a first threshold value. The first primary message may comprise information that the handover will happen with the calculated probability p.

Further, the handover prediction module 502 may be configured to generate the first primary message when a first radio quality level of the first radio network node 304 is below a second threshold value, or to generate the first primary message when a relative radio quality between the first radio network node 304 and the second radio network node 306 is below a third threshold value.

In some embodiments, the handover prediction module 502 is further configured to generate the first primary message when a second radio quality level of the second radio network node 306 is higher than a first radio quality level of the first radio network node 304.

The handover prediction module 502 may further be configured to generate a second primary message comprising information about a handover that will happen, when the user equipment 302 has knowledge about a handover that is to happen. This may be the case, when the user equipment 302 has sent a measurement report to the communications system 300.

The first primary message and/or the second primary message may comprise information about an expected point in time for the handover and about an expected outage time for the handover.

In some embodiments, the handover prediction module 502 is further configured to generate a first secondary message comprising information about a cancellation of the handover. The handover prediction module 502 may be configured to generate such a cancellation message when the first primary message and/or the second primary message has been generated and when the first radio quality level of the first radio network node 304 is above the second threshold value.

The handover prediction module 502 may further be configured to generate a second secondary message comprising information about an outage time that has started. The handover prediction module 502 may be configured to generate such a message when the first primary message and/or the second primary message have been generated and when a message confirming a beginning of the handover is received. The message confirming the beginning of the handover may for example be an RRC connection reconfiguration request.

In some embodiments, the handover prediction module 502 is further configured to generate a third secondary message comprising information about a finalized handover. The handover prediction module 502 may be configured to generate such a message when the first primary message and/or the second primary message have been generated and when a message confirming an end of the handover is sent. The message confirming the end of the handover may be sent by the user equipment 302. Further, the message confirming the end of the handover may be an RRC connection reconfiguration complete message.

A handover statistics module 503 may further be comprised in the apparatus 301. The handover statistics module 503 is configured to receive and store historical handover information and provide the handover prediction module 502 with the collected historical handover information. As previously mentioned, the collected historical handover information relates to at least one handover previously performed between the first radio network node 304 and the second radio network node 306 by the user equipment 302. The collected historical handover information may comprise information relating to at least one of a point in time for the previously performed handover, a first radio network node 304, a second radio network node 306, a radio quality of a first radio network node 304 x seconds before the handover, a radio quality of the second radio network node 306 x seconds before the handover, a radio quality of the first radio network node 304 y seconds after the handover, a radio quality of the second radio network node 306 y seconds after the handover, a location of the user equipment 302 when performing a radio quality measurement, a handover result, or a handover outage time.

Furthermore, the apparatus 301 comprises an adaptation control module 504. The adaptation control module 504 is configured to adapt the play out of the data packets in dependence of the at least one message, whereby radio quality degradation in the real-time service application is minimized.

The adaptation control module 504 may be configured to adapt the play out of the data packets by increasing a fill level of a jitter buffer 505 comprised in the apparatus 301, which jitter buffer 505 will be described in more detail below.

In some embodiments, the adaptation control module 505 is configured to increase the fill level when the number of data packets relating to the real-time service application comprised in the jitter buffer 505 is determined not to be sufficient to avoid buffer under-run under a handover outage, when a probability p for a handover is above a threshold and before a handover is performed. The adaptation control module 504 may further be configured to increase the fill level of the jitter buffer 505 by performing play out time adjustment, e.g. by performing time-scaling.

In some embodiments, the adaptation control module 504 is configured to notify one or more peer adaptation control modules (cf. FIG. 8) comprised in one or more peer apparatuses (cf. FIG. 8) about a potential handover. Thereby, the service quality may be further improved. The remote peer's knowledge of potential handover of the user equipment 302 may be beneficial for some services. For example, in a VoIP call service, the remote peer may also increase its jitter buffer to avoid potential buffer under-run when the user equipment 302 is doing a handover. How to notify the peers about potential handovers may be an application issue. It may have advantages for some applications while are useless in others. Also, when and which messages to send about handover prediction and/or actual handovers could be application specific.

As already mentioned, the apparatus 301 may comprise a buffer such as a jitter buffer 505. In real-time services such as Voice over IP (VoIP), a jitter buffer is a shared data area where voice data packets may be collected, stored, and sent to a voice processor in evenly spaced intervals. Variations in packet arrival time, called jitter, may occur because of network congestion, timing drift, or route changes. The jitter buffer, which is located at the receiving end of a voice connection, is configured to intentionally delay the arriving data packets so that the end user experiences a clear connection with very little sound distortion.

A Voice over IP (VoIP) jitter buffer algorithm is designed in such a way that the play out is delayed as little as possible, while still allowing most of the data packets to arrive in time for their play out time.

Embodiments herein for adapting play out of data packets during a handover of the user equipment 302 between the first radio network node 304 and the second radio network node 306 may be implemented through one or more processors, such as a processing circuit 506 in the apparatus 301 depicted in FIG. 5, together with computer program code for performing the functions and/or method actions of embodiments herein.

It should be understood that one or more of the circuits comprised in the apparatus 201 described above may be integrated with each other to form an integrated circuit.

The apparatus 301 may further comprise a memory 507. The memory may comprise one or more memory units and may be used to store for example data such as thresholds, predefined or pre-set information, etc.

Some embodiments herein do also relate to the first user equipment 302 comprising the apparatus 301. Further, some embodiments herein relate the second user equipment 308 in the shape of e.g. a computerized device, which computerized device comprises the apparatus 301.

Exemplifying Embodiments I

Exemplifying embodiments of the apparatus 301 being comprised in the user equipment 302 will now be described with reference to FIG. 6.

The handover prediction module 502 receives layer 2 information about radio quality measurements of both the serving and adjacent cells of the UE, continuously or when the radio quality passes a certain predefined value. The handover prediction module 502 also receives information from the RRC layer, including; sending of measurement report to the serving cell, reception of RRC connection reconfiguration from source cell, sending of RRC connection reconfiguration complete to the target cell. The layer 2 information and/or the RRC layer information and/or parts thereof are herein sometimes also referred to as current handover information.

The handover statistics module 503 receives similar information as the handover prediction module 502, but its only action is to store handover information into e.g. a local database or memory comprised in the apparatus 301. The database may comprise all necessary information for the handover prediction module 502 to make handover predictions. That is handover predictions which includes calculation of a probability that handover will occur, expected time until handover outage begins, expected handover outage time. The handover statistics module 503 may for example store statistics individually for each cell pair about historic handovers, and the radio environment situation some time window before/after those handovers.

An example historic handover database record created by the handover statistics module 502 may comprise the one or more of the following fields: time, source cell, target cell, radio quality of source cell x seconds before handover happened (array), radio quality of target cell x seconds before handover happened (array), radio quality of source cell y seconds after handover happened (array), radio quality of target cell y seconds after handover happened (array), GPS location of those radio quality measurements (if available in UE), handover result (success/failure, possibly including reason of a possible failure), and handover outage time All handover events from the past may be stored by the handover statistics module 503 in the database. However, the handover statistics module 503 may store an aggregation of data e.g. aggregated per cell pair to limit the storage space needed. Per cell pair aggregation record could e.g. include: source cell, target cell, average source cell radio quality at time of handover between these cells, average target cell radio quality at time of handover between these cells, probability that a handover later happened when the measured source cell compared to target cell quality was between some interval, average (and/or distribution) duration from the time when the difference between the source and target cell radio quality was within some interval until a handover happened, and average (and/or distribution) handover outage time between these cells.

Based on the information stored in the handover statistics module 503 together with the current handover information, i.e. current radio quality measurements, the handover prediction module continuously computes the probability that a handover will occur from the source cell to some target cell in the near future. If the probability of this passes some predefined threshold a message is sent to the application layer, signaling that the handover will probably happen. If the handover prediction module then receives an event from the RRC layer saying that the measurement report was sent to the network, another message is sent to the application layer, signaling that the handover will certainly happen. In the other case when the source cell radio quality could once again become better, a message is sent to the application layer to cancel the handover warning.

The adaptation control module 504 decides the time scaling of data packets and thus controls the size of the jitter buffer 505. The adaptation control module 504 receives buffer status and packet arrival information from the jitter buffer 505. Further, the adaptation control module 504 receives information, such as handover information from the handover prediction module 502.

During normal VoIP operation, the jitter buffer 505 will comprise very few audio frames in order to minimize the end-to-end, i.e. the mouth-to-ear, delay of the users. By using time scaling techniques it would be possible to increase the buffer fill level over time, getting enough audio frames in the buffer 505 to avoid under-run during a handover outage. However this cannot be done too fast, since time scaling itself causes audio quality degradation.

Examples of messages that may be sent from the handover prediction module 502 to the application layer, e.g. to the adaptation control module 504, will be given below. For each type of message, the underlying events and database analytics that result in this message will also be described.

A first primary message is a first handover warning message such as a "handover attempt prediction" message comprising information that the handover attempt will happen with a probability of p. This warning message may be triggered by different events.

Firstly, when the radio quality, e.g. the RSRP of the serving cell, such as the first radio network node 304, drops below a certain threshold value defined by the handover prediction module 502, the warning message may be sent.

Secondly, when the user equipment 302 has an Enter Event3A, which means that an adjacent cell, e.g. the second radio network node 306, has a radio quality that is higher than the radio quality of the serving cell by a number of dBs equal to HO hysterisis, the warning message may be sent. The actual parameters p, expected time until handover, and predicted handover outage time are based on the analytics from the handover statistics module 503, which comprises information about previous handover situations between the relevant cell pair, e.g. between the first and second radio network nodes 304,306.

A second primary message is a second warning message such as a "handover attempt" message. The message is sent when a handover attempt will happen. The message may thus be sent when an RRC measurement report message has been sent to the serving eNodeB, e.g. the first radio network node 304. At this stage, handover will happen if no failure occurs. The expected time of the handover and the outage time are based on the analytics of the handover statistics module 503.

A first secondary message is a "handover warning clearing" message. This message is sent when the radio quality of the serving cell, e.g. the first radio network node 304, is good again. In such case, the warning for handover flag is cleared. The message is sent out when either a Leave Event3A occurs, or when the radio quality is above a certain predefined value specified by handover prediction module 502.

A second secondary message is a first handover notification message such as a "handover outage time has started" message. The message may be sent when the RRC connection reconfiguration request is received at the user equipment 302, which first user equipment 302 will experience an outage from this time. The outage time estimate is received from the handover statistics module 503.

A third secondary message is a second handover notification message such as a "handover is finalized, connection back up again" message. The message may be sent when the RRC connection reconfiguration complete is sent out from the UE. The UE is reconnected to the network again.

In the VoIP application scenario, the adaptation control module 504 receives the above mentioned messages from the handover prediction module 503, and may then improve the performance of the jitter buffer 505.

A target of the jitter buffer management of the adaptation control module 504 is to avoid buffer under-run situation due to handover outage time. The way of doing that is by making sure that the number of data packets, i.e. frames, in the jitter buffer 505 is sufficient to cope with the expected handover outage time. The expected handover outage time is signaled in the message from the handover prediction module 502. The adaptation control module 504 checks the number of frames currently in the jitter buffer 505, and compares with the expected time until handover outage and the expected handover outage time. If the number of frames is already sufficient to avoid under-run during the handover outage, no action needs to be taken. On the other hand, if the number of frames is determined to be too few, and the probability of handover (as signaled in the message from handover prediction module 502) is large enough, the adaptation control module 504 may determine to try to increase the buffer fill level before the handover. This may be implemented by starting to expand the audio frames by time scaling technique, e.g. by playing-out the audio during a longer time period than it was originally recorded. However, this comes at a cost in audio quality perception, and cannot be done too aggressively.

The time available to increase the buffer fill level depends on how certain the handover prediction module 502 is that a handover will happen before it actually happens. This analysis is based on the historic database records, and will most likely be different between different cell pairs. However, it will certainly be longer than the handover preparation time, which is in the order of 30 ms.

The adaptation control module 504 may also be more or less aggressive when it comes to increasing the buffer fill level, depending on the signaled probability of handover. The time scaling causes some audio degradation which is not desirable if the handover will not happen, and also increases the mouth-to-ear delay. So the adaptation control module 504 will have to take these tradeoffs into account to determine a good threshold for when to start increasing the buffer fill level before an expected handover. The exact implementation is an engineering issue and depends on the parameters in the messages from the handover prediction module 502.

If all handovers are preceded by messages, the size of the jitter buffer 505 may be optimized based on information relating to the delay and the jitter. Further, the packet samples experiencing handover may be removed from the jitter estimation and the jitter may be studied only when no handover occurs. In this way, a smaller jitter buffer 505 will be used when handover does not occur, and thereby improving the VoIP performance.

Figure 6:
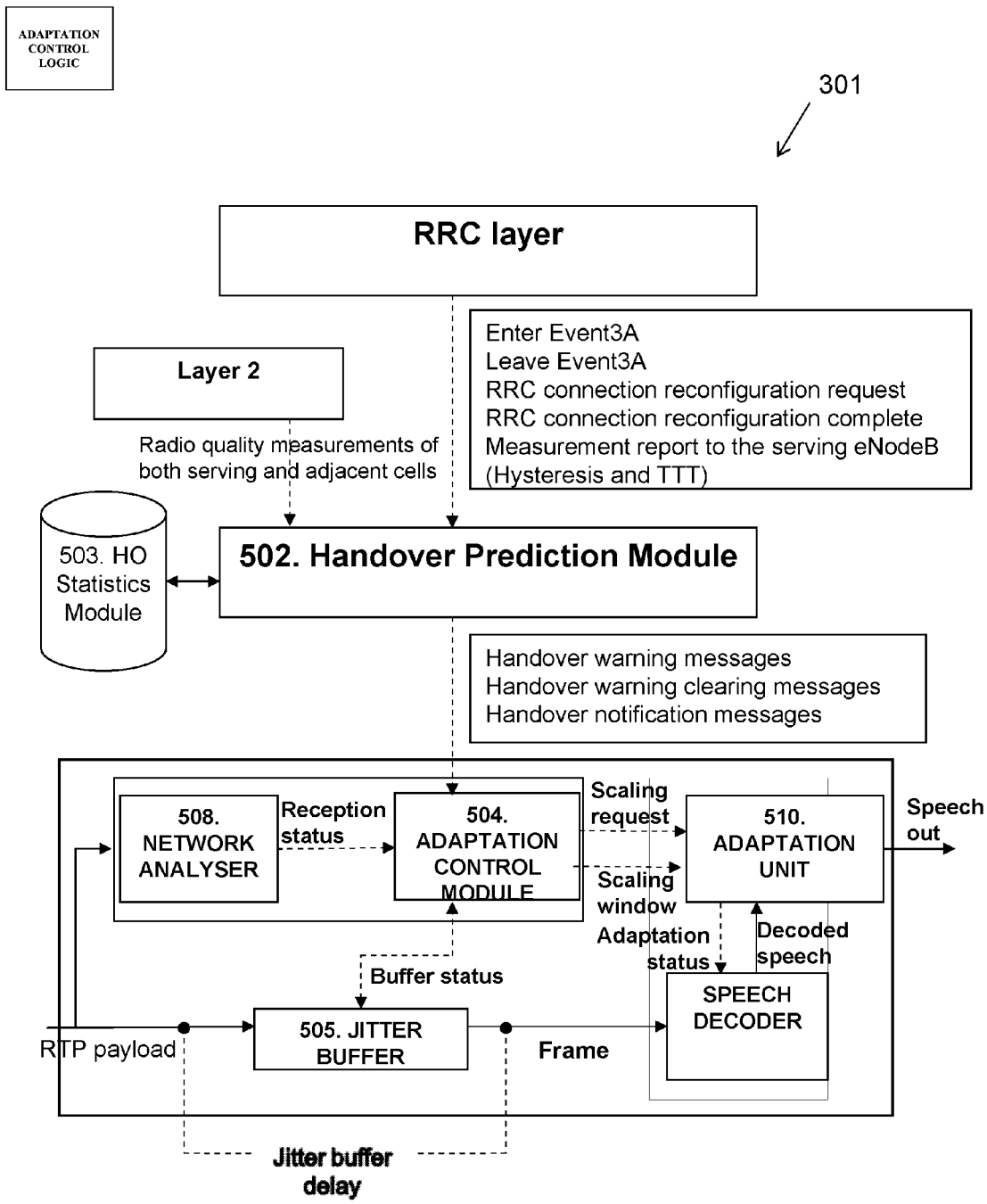
FIG. 6 is a combined flow chart and block diagram illustrating embodiments of an apparatus.

As schematically illustrated in FIG. 6, the apparatus 301 may further comprise a network analyzer 508 configured to receive payload such as RTP payload, and to generate reception status based on the received payload. The generated reception status may comprise relevant information about the point of time the packets arrive from the RTP payload. The generated reception status is received by the adaptation control module 504. The adaptation control module 504 also receives buffer status from the jitter buffer 505. By means of the reception status and the buffer status, the adaptation control module 504 generates and a scaling request and a scaling window to an adaptation unit 510 comprised in the apparatus 301. The scaling request is a request to apply time scaling techniques and the scaling window is an input parameter to the time scaling algorithm. The adaptation unit 510 is configured to receive the scaling request and the scaling window from the adaptation control module 504. Further, the adaptation unit 510 is configured to perform time scaling based on the received scaling request and scaling window in order to reduce impairments by e.g. reconstructing the speech from a smaller number of decoded packets by interpoling. However, it should be understood that the adaptation unit 510 may be configured to perform any other adaptation technique.

The adaptation control module 504 may scale the buffer size based on the result of the performed time scaling.

A speech decoder 512 may further be comprised in the apparatus 301. The speech decoder 512 is configured to receive frames from the jitter buffer 505. Further, the speech decoder 510 receives adaptation status from the adaptation unit 510 and sends decoded speech to the adaptation unit 510.

Figure 7A:
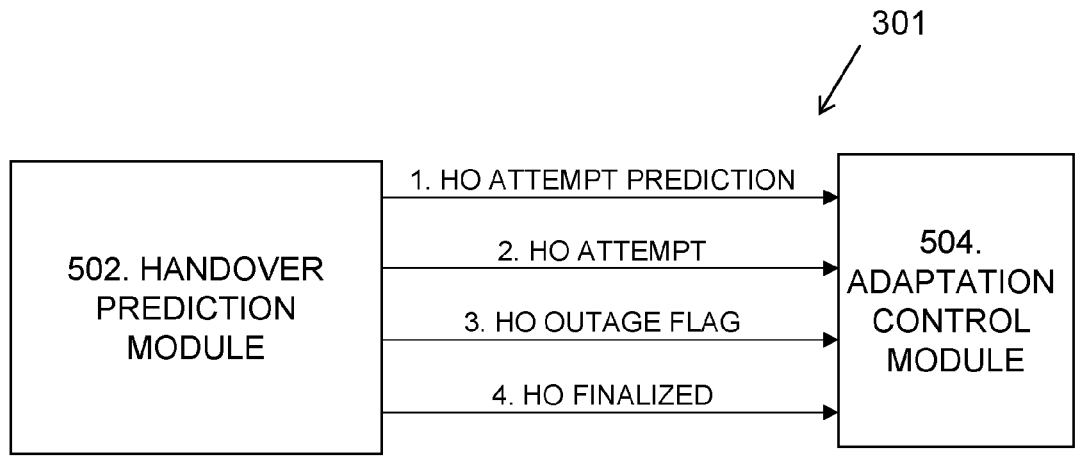
FIGS. 7a and 7b are combined flow charts and block diagrams illustrating embodiments of an apparatus.
Figure 7B:
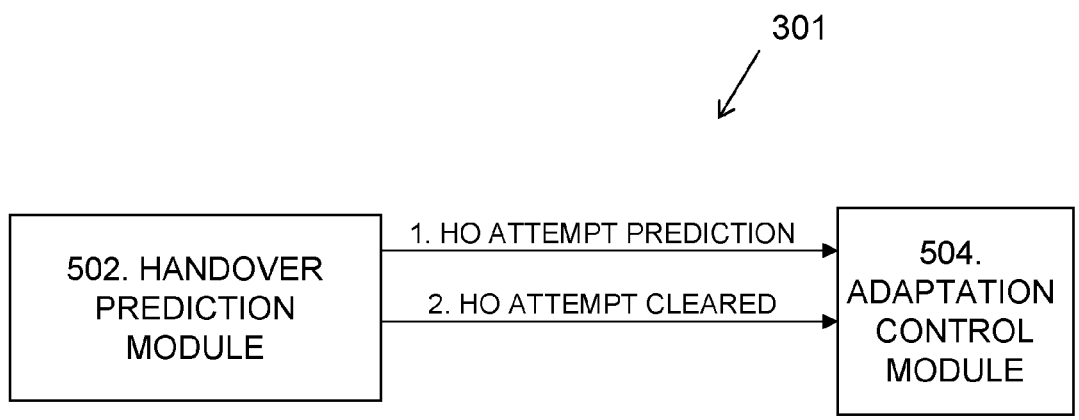

FIGS. 7a and 7b schematically illustrate combined flow charts and block diagrams of embodiments of a part of the apparatus 301.

In FIG. 7a, the messages sent from the handover prediction module 502 to the adaptation control module 504 for a successful handover is schematically shown. As illustrated in FIG. 7a, the handover prediction module 502 sends the first primary message, i.e. the "handover attempt prediction" message to the adaptation control module 504, when the handover (HO) is predicted with a certain probability p as described above. Then, when a handover attempt will happen, the second primary message, i.e. the "handover attempt" message, will be sent to the adaptation control module 504. When the outage time starts, the handover prediction module 502 will send the second secondary message, i.e. the "handover outage time has started" message, to the adaptation control module 504 in order to notify the adaptation control module 504 about the outage time. When the handover is finalized, the handover prediction module 502 sends the third secondary message, i.e. the "handover is finalized, connection back up again" message, to the adaptation control module 504.

In FIG. 7b, the messages sent from the handover prediction module 502 to the adaptation control module 504 when a handover attempt is cleared is schematically shown. As illustrated in FIG. 7b, the handover prediction module 502 sends the first primary message, i.e. the "handover attempt prediction" message to the adaptation control module 504, when the handover is predicted with a certain probability p as described above. Then, when the radio quality of the serving cell, i.e. the first radio network node 304, is good again and for example is above a certain threshold value, the handover prediction is cleared and the first secondary message, i.e. the "handover warning clearing" message, is sent to the adaptation control module 504.

Exemplifying Embodiments II

Exemplifying embodiments of the apparatus 301 being comprised in first and second user equipments 302,308 of a peer-to-peer system 800 will now be described with reference to FIG. 8. As previously mentioned, the first and second user equipments 302,308 may be e.g. a mobile terminal or a wireless terminal, a mobile phone, a computerized device such as e.g. a laptop, a tablet pc such as e.g. an iPad™, a Personal Digital Assistant (PDA), or any other radio network unit capable to communicate over a radio link in a cellular communications network.

Figure 8:
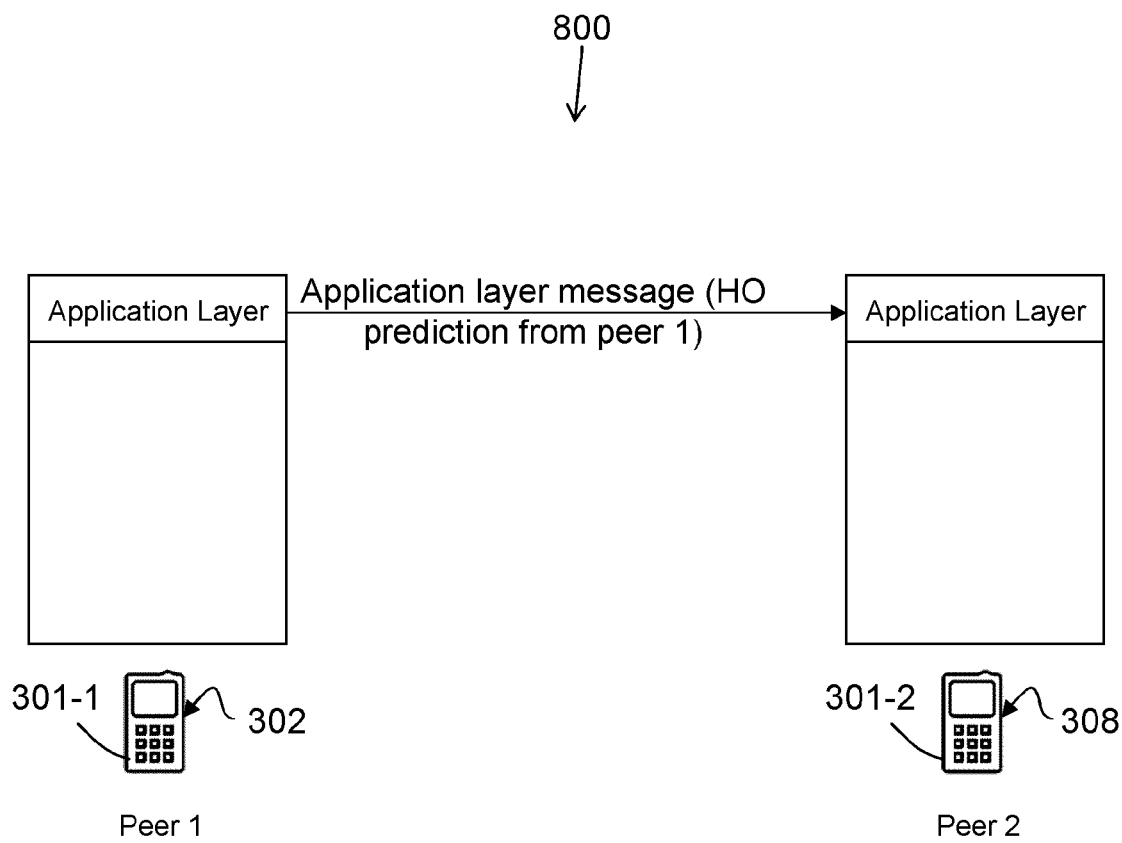
FIG. 8 is a combined flow chart and block diagram illustrating embodiments of a peer-to-peer system.

As illustrated in FIG. 8, in some embodiments, the peer-to-peer system 800 comprises a first user equipment 302 and a second user equipment 308. The first user equipment 302 is configured to predict a handover of the first user equipment 302 as described above. The handover may be predicted by a handover prediction module 502-1 comprised in the apparatus 301-1 of the first user equipment 302. Further, a message is sent from the handover prediction module 503-1 to an adaptation control module 504-1 comprised in the apparatus 301-1 of the first user equipment 302. The adaptation control module 504-1 then sends a message, e.g. an application layer message, to an adaptation control module 504-2 of the second user equipment 308. The second user equipment 308 receives the message and may adapt its transmission of data packets in dependence of the received message. For example, in a VoIP call, the remote peer, i.e. the second user equipment 308, may increase its jitter buffer to avoid potential buffer under-run when the first user equipment 302 is doing a handover. Thereby, the service quality may be improved.

Although the description above contains many specifics, they should not be construed as limiting but as merely providing illustrations of some presently preferred embodiments. The technology fully encompasses other embodiments which may become apparent to those skilled in the art. Reference to an element in the singular is not intended to mean "one and only one" unless explicitly so stated, but rather "one or more." All structural and functional equivalents to the elements of the above-described embodiments that are known to those of ordinary skill in the art are expressly incorporated herein by reference and are intended to be encompassed hereby. Moreover, it is not necessary for a device or method to address each and every problem sought to be solved by the described technology for it to be encompassed hereby.

When using the word "comprise" or "comprising" it shall be interpreted as non-limiting, in the meaning of consist at least of.

When using the word action/actions it shall be interpreted broadly and not to imply that the actions have to be carried out in the order mentioned. Instead, the actions may be carried out in any suitable order other than the order mentioned. Further, some action/actions may be optional.

The embodiments herein are not limited to the above described examples. Various alternatives, modifications and equivalents may be used. Therefore, the above examples should not be taken as limiting the scope of the invention, which is defined by the appending claims.

The invention claimed is:

1. A method in an apparatus for adapting play out of data packets during a handover of a user equipment between a first radio network node and a second radio network node, which data packets relate to a real-time service application and which user equipment, first and second radio network nodes are comprised in a communications system, the method comprising:

generating at least one message based on collected historical handover information and on current handover information, wherein the collected historical handover information relates to at least one handover previously performed between the first radio network node and the second radio network node by the user equipment, and wherein the current handover information relates to current radio control parameter settings for first radio network node and the second radio network node, wherein the generating the at least one message further comprises;

generating a first primary message when a calculated probability D that a handover will occur between the first radio network node and the second radio network node passes a first threshold value, and wherein the first primary message comprises information that the handover will happen with the calculated probability p; and generating a second primary message comprising information about a handover that will happen when the user equipment knows that a handover is to happen; and adapting the play out of the data packets in dependence of the at least one message such that radio quality degradation in the real-time service application is controlled, wherein the play out of the data packets is adapted by increasing fill level of a jitter buffer in an event the calculated probability p for the handover is above a threshold and before a handover is performed when a number of the data packets relating to the real-time service application in the litter buffer is determined not to be sufficient to avoid buffer under-run during a handover outage.

2. The method of claim 1, wherein the generating the at least one message further comprises:

generating the first primary message when a first radio quality level of the first radio network node is below a second threshold value, or generating the first primary message when a relative radio quality between the first radio network node and the second radio network node is below a third threshold value.

3. The method of claim 1, wherein the generating the at least one message further comprises generating the first primary message when a second radio quality level of the second radio network node is higher than a first radio quality level of the first radio network node.

4. The method of claim 1, wherein the first primary message and/or the second primary message comprises information about an expected point in time for the handover and about an expected outage time for the handover.

5. The method of claim 1, wherein the generating at least one message further comprises:
when the first primary message and/or the second primary message has been generated and when the first radio quality level of the first radio network node is above the second threshold value, generating a first secondary message comprising information about a cancellation of the handover.

6. The method of claim 1, wherein the generating at least one message further comprises:
when the first primary message and/or the second primary message has been generated and when a message confirming a beginning of the handover is received, generating a second secondary message comprising information about an outage time that has started.

7. The method of claim 1, wherein the generating at least one message further comprises:
when the first primary message and/or the second primary message has been generated and when a message confirming an end of the handover is sent, generating a third secondary message comprising information about a finalized handover.

8. An apparatus for adapting play out of data packets during handover of a user equipment between a first radio network node and a second radio network node, which data packets relate to a real-time service application and which user equipment, first and second radio network nodes are comprised in a communications system, the apparatus comprising:
one or more processors executing program instructions stored on a non-transitory storage medium, the one or more processor configured to:
generate at least one message based on collected historical handover information and on current handover information, wherein the collected historical handover information relates to at least one handover previously performed between the first radio network node and the second radio network node by the user equipment, and wherein the current handover information relates to current radio control parameter settings for the first radio network node and the second radio network node, wherein
the one or more processors are further to generate a first primary message when a calculated probability p that a handover will occur between the first radio network node and the second radio network node passes a first threshold value, and wherein the first primary message comprises information that the handover will happen with the calculated probability p; and wherein the one or more processors are further to generate a second primary message comprising information about a handover that will happen when the user equipment knows that a handover is to happen, and
adapt the play out of the data packets in dependence of the at least one message, whereby radio quality degradation in the real-time service application is minimized, wherein the one or more processors are configured to adapt the play out of the data packets by increasing fill level of a jitter buffer in an event the calculated probability p for the handover is above a threshold and before a handover is performed when a number of data packets relating to the real-time service application in the jitter buffer is determined not to be sufficient to avoid buffer under-run during a handover outage.

9. The apparatus of claim 8, wherein the one or more processors are further to generate the first primary message when a first radio quality level of the first radio network node is below a second threshold value, or to generate the first primary message when a relative radio quality between the first radio network node and the second radio network node is below a third threshold value.

10. The apparatus of claim 8, wherein the one or more processors are further to generate the first primary message when a second radio quality level of the second radio network node is higher than a first radio quality level of the first radio network node.

11. The apparatus of claim 8, wherein the first primary message and/or the second primary message comprises information about an expected point in time for the handover and about an expected outage time for the handover.

12. The apparatus of claim 8, wherein the one or more processors are further to generate a first secondary message comprising information about a cancellation of the handover, when the first primary message and/or the second primary message has been generated and when the first radio quality level of the first radio network node is above a second threshold value.

13. The apparatus of claim 8, wherein the one or more processors are further to generate a second secondary message comprising information about an outage time that has started, when the first primary message and/or the second primary message has been generated and when a message confirming a beginning of the handover is received.

14. The apparatus of claim 8, wherein the one or more processors are further to generate a third secondary message comprising information about a finalized handover, when the first primary message and/or the second primary message has been generated and when a message confirming an end of the handover is sent.

15. A user equipment comprising the apparatus of claim 8.

* * * * *